United States Patent
Knoefler et al.

(10) Patent No.: US 10,845,332 B2
(45) Date of Patent: Nov. 24, 2020

(54) METHOD FOR THE DYNAMIC MONITORING OF A NOX SENSOR

(71) Applicant: Robert Bosch GmbH, Stuttgart (DE)

(72) Inventors: Eckehard Knoefler, Marbach (DE); Torsten Handler, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/307,641

(22) PCT Filed: May 8, 2017

(86) PCT No.: PCT/EP2017/060901
§ 371 (c)(1),
(2) Date: Feb. 25, 2019

(87) PCT Pub. No.: WO2017/211521
PCT Pub. Date: Dec. 14, 2017

(65) Prior Publication Data
US 2019/0195828 A1    Jun. 27, 2019

(30) Foreign Application Priority Data

Jun. 6, 2016   (DE) .................. 10 2016 209 924

(51) Int. Cl.
*G01N 27/419* (2006.01)
*F01N 11/00* (2006.01)
*G01N 27/417* (2006.01)

(52) U.S. Cl.
CPC ......... *G01N 27/4175* (2013.01); *F01N 11/00* (2013.01); *F01N 11/007* (2013.01);
(Continued)

(58) Field of Classification Search
CPC ............. G01N 27/4175; G01N 27/419; G01N 27/4074; G01N 33/0037; Y02A 50/245;
(Continued)

(56) References Cited

U.S. PATENT DOCUMENTS 6,471,840 B1 * 10/2002 Gao ................... G01N 27/4175
                                                               204/425
2005/0061684 A1    3/2005 Bausewein et al.
(Continued)

FOREIGN PATENT DOCUMENTS

CN        105089759 A      11/2015
CN        108318565 A       7/2018
(Continued)

OTHER PUBLICATIONS

International Search Report for Application No. PCT/EP2017/060901 dated Jul. 19, 2017 (English Translation, 2 pages).

*Primary Examiner* — Brandi N Hopkins
(74) *Attorney, Agent, or Firm* — Michael Best & Friedrich LLP

(57) ABSTRACT

The invention relates to a method for monitoring a NOx sensor (10) having an oxygen-ion-conducting solid electrolyte and having at least one cavity (12), wherein at least one cavity (12) of the NOx sensor is flooded with a defined oxygen concentration during a self-diagnosis of the NOx sensor. The gradient of a pump current resulting therefrom is evaluated and, in the case of a deviation in comparison with reference values, possibly impaired dynamics of the NOx sensor are inferred.

12 Claims, 2 Drawing Sheets

(52) U.S. Cl.
CPC ........ *G01N 27/419* (2013.01); *F01N 2550/00* (2013.01); *F01N 2550/02* (2013.01); *F01N 2560/026* (2013.01); *Y02T 10/40* (2013.01)

(58) Field of Classification Search
CPC ............... F01N 11/007; F01N 2550/02; F01N 2560/026; F01N 11/00; F01N 2550/00; Y02T 10/47
See application file for complete search history.

(56) References Cited

U.S. PATENT DOCUMENTS

| | | | |
|---|---|---|---|
| 2008/0011051 A1* | 1/2008 | Lemire | G01N 27/419 73/23.31 |
| 2012/0097553 A1* | 4/2012 | Classen | G01N 27/4074 205/781 |
| 2019/0195828 A1* | 6/2019 | Knoefler | F01N 11/007 |

FOREIGN PATENT DOCUMENTS

| | | |
|---|---|---|
| DE | 10244125 | 4/2004 |
| DE | 10312732 | 10/2004 |
| DE | 102010042701 | 4/2012 |
| DE | 102012205464 | 10/2012 |
| EP | 2587255 | 5/2013 |

\* cited by examiner

METHOD FOR THE DYNAMIC MONITORING OF A NOX SENSOR

BACKGROUND OF THE INVENTION

The present invention relates to a method for monitoring a NOx sensor having an oxygen-ion-conducting solid electrolyte and at least one cavity (measuring chamber). Furthermore, the invention relates to a computer program for carrying out the method and a machine-readable storage medium and an electronic control unit, which are configured to carry out the method.

NOx sensors (NOx measuring probes), which are based on the Nernst principle, are known for measuring the NOx concentration in a measuring gas, for example in the exhaust gas of an internal combustion engine. For example, a NOx measuring probe is disclosed in German published application DE 103 12 732 A1, in which the oxygen concentration is lowered by a first pump current in a first cavity, which is separated from the exhaust gas by a diffusion barrier. In a second cavity, which is separated from the first cavity by a diffusion barrier, the oxygen concentration is further reduced by a second pump current. The nitrogen oxides contained in the gas are decomposed at a measuring electrode in the second cavity. The oxygen released in this case is transported using a third pump current to an outer electrode and at the same time is a measure of the NOx concentration in the second cavity and thus also in the exhaust gas to be measured.

Since a NOx sensor is a component relevant to exhaust gas, monitoring of the NOx sensor is prescribed by legislators. A so-called NOx sensor internal diagnosis is already known for monitoring NOx sensors. In this case, a measuring chamber of the NOx sensor is flooded with a defined oxygen concentration, for example by lowering the Nernst voltage of the sensor. The oxygen is then reacted at the measuring electrode (NOx electrode). The resulting pump current curve is measured and can be analyzed for the internal diagnosis, by comparing an integral of the resulting pump current to a reference value, for example to a reference value which was measured in the sensor as a new part. This NOx sensor internal diagnosis is also referred to as NOx cell status monitoring.

In addition to the detection of a characteristic curve drift of a NOx sensor, the dynamic response of the NOx signal also has to be monitored. However, if such a NOx sensor is arranged downstream of an SCR catalytic converter, dynamic response monitoring of the NOx signal is no longer possible, since no noteworthy NOx emissions occur downstream of an SCR catalytic converter at the given strict limiting values for NOx.

In principle, two methods for dynamic response monitoring of the NOx sensor are known in the case of an installation location of the NOx sensor, for example, after an exhaust gas turbocharger or after a diesel oxidation catalytic converter and/or a diesel particle filter in which no NOx is converted. In a first method, the gradient of the NOx signal is evaluated in the case of a transition from a load mode into a coasting mode. In a more up-to-date, second method, the high-frequency components of a NOx model are compared to the sensor data under dynamic conditions. One condition for carrying out the second method is the presence of a dynamic NOx crude emission model.

Modern exhaust gas posttreatment systems are often based on a combination of a nitrogen oxide storage catalytic converter (NSC) and an SCR catalytic converter. In general, a first NOx sensor is arranged downstream of the NSC and a second NOx sensor is arranged downstream of the SCR catalytic converter. Since NOx is converted in the NSC and there is no NOx model for the position downstream of the NSC, the first NOx sensor between the NSC and the SCR catalytic converter is required to be able to generate a NOx concentration signal, which is necessary for a pilot control of the reducing agent metering quantity for the SCR catalytic converter. However, since an accurate and dynamic NOx model for determining the NOx concentration downstream of the NSC does not exist, the above-described method for dynamic response monitoring, which requires such a dynamic NOx emission model, is not possible.

SUMMARY OF THE INVENTION

The present invention provides a method for the monitoring and in particular for the dynamic response monitoring of a NOx sensor, which in particular can advantageously also be used in those cases in which conventional methods cannot be used. The method proceeds from a NOx sensor which is based on an oxygen-ion-conducting solid electrolyte. The NOx sensor is embodied having a layered structure, for example, in such a way that it has at least one cavity (measuring chamber). For example, two cavities (first cavity and second cavity as measuring chamber) and a reference gas space are provided. By way of suitable arrangement of various electrodes, for example at least one inner electrode (inner pump electrode) and at least one outer electrode (outer pump electrode), and also a reference electrode and a measuring electrode (NOx pump electrode) and corresponding counter-electrodes, a measurement of the NOx concentration in a measuring gas is carried out, wherein the arrangement of the electrodes preferably forms an oxygen pump cell and a Nernst cell, comparable to broadband lambda probes. In addition, a NOx pump cell is provided as a third cell. For the regular measurement, the oxygen concentration in a first cavity is preferably reduced by applying pump currents. A decomposition of NO takes place at a measuring electrode in the second cavity (measuring chamber), which is separated by a diffusion barrier from the first cavity, wherein the oxygen released in this case is pumped out of the corresponding cavity (measuring chamber) by means of a further pump current. This pump current is a measure of the NOx concentration. During an internal diagnosis of the NOx sensor, at least one cavity of the NOx sensor, preferably at least the second cavity (measuring chamber), is flooded with a defined oxygen concentration. The time curve, for example the gradient of the resulting pump current, is analyzed in this case according to the invention. In the event of a deviation of at least one variable, which represents this time curve of the pump current, in comparison to reference values, a possible existence of an impaired dynamic response of the NOx sensor is inferred. In other words, the pump current, which results from the flooding with oxygen and the defined oxygen concentration resulting therefrom in the measuring chamber of the sensor, is analyzed in such a way that the time curve of the pump current is observed. Previously known methods always analyze an overall integral of NOx during the internal diagnosis. In the case of an analysis of the time curve in comparison to reference values or expected values, an impaired dynamic response of the NOx sensor can be inferred if a deviation exists. Conventional methods using an analysis of the overall integral of the resulting pump current, in contrast, only permit a statement with respect to the overall sensitivity of the sensor, but not with respect to the dynamic response.

When the method according to the invention is carried out, at the beginning of the internal diagnosis, for example, the cavity (for example, measuring chamber) is flooded with a defined oxygen concentration by reducing the Nernst voltage, for example to approximately 225 mV. The oxygen is reacted at the NOx electrode, so that a specific pump current results. Because of the rapid increase of the oxygen concentration in the cavity, it is to be expected that the resulting pump current also rises strongly and rapidly. However, if, for example, damage to the NOx electrode or a corresponding diffusion barrier is present in the sensor, the reaction of the NOx sensor is delayed and the resulting pump current rises less rapidly. This is detected according to the invention by means of an analysis, for example, of the gradient during the internal diagnosis.

In one possible embodiment of the invention, the time curve of the pump current can be analyzed by observing a variable which represents the gradient of the rising pump current during the internal diagnosis. Alternatively or additionally, it is also possible that, for example, the gradient of the falling pump current is analyzed during the internal diagnosis. The falling pump current occurs at the end of the internal diagnosis and/or after ending the flooding of the cavity with oxygen. In principle, an evaluation of the chronological signal curve can thus take place in both directions, upward during the start of the internal diagnosis and downward at the end of the internal diagnosis, so that a two-sided NOx signal dynamic response monitoring is possible, including in combination together.

If an impaired dynamic response of the NOx sensor can be established, a poisoned NOx electrode and/or a clogged NOx diffusion barrier in the NOx sensor can be inferred.

The NOx sensor which is monitored according to the invention is preferably provided for arrangement in the exhaust system of the internal combustion engine of a motor vehicle. For example, the NOx sensor can be arranged downstream of a turbocharger associated with the internal combustion engine and/or downstream of a nitrogen oxide storage catalytic converter and/or downstream of a diesel particle filter and/or upstream of an SCR catalytic converter and/or downstream of an SCR catalytic converter. The method according to the invention can particularly advantageously be used in NOx sensors which are placed at installation locations for which no dynamic NOx emission models exist. Since conventional methods which operate with NOx emission models for dynamic response monitoring cannot be used at such installation locations of a NOx sensor, the method according to the invention can particularly advantageously be used for such NOx sensors. The method according to the invention is suitable in this case in particular for the dynamic response monitoring of NOx sensors which are arranged downstream of a catalytic converter, at which a conversion of nitrogen oxides takes place. For example, the method according to the invention can particularly advantageously be used for those NOx sensors which are arranged between an NSC and an SCR catalytic converter or downstream of an SCR catalytic converter.

The invention furthermore comprises a computer program which is configured to carry out the steps of the described method. Furthermore, the invention comprises a machine-readable storage medium, on which such a computer program is stored, and an electronic control unit, which is configured to carry out the steps of the described method. The implementation of the method according to the invention as a computer program and/or as a machine-readable storage medium or as an electronic control unit has the special advantage that the advantages of the method according to the invention for the dynamic response monitoring of a NOx sensor may thus also be used in existing motor vehicles.

BRIEF DESCRIPTION OF THE DRAWINGS

Further features and advantages of the invention result from the following description of exemplary embodiments in conjunction with the drawings. In this case, the individual features can each be implemented alone or in combination with one another.

In the drawings.

DETAILED DESCRIPTION

Figure 1:
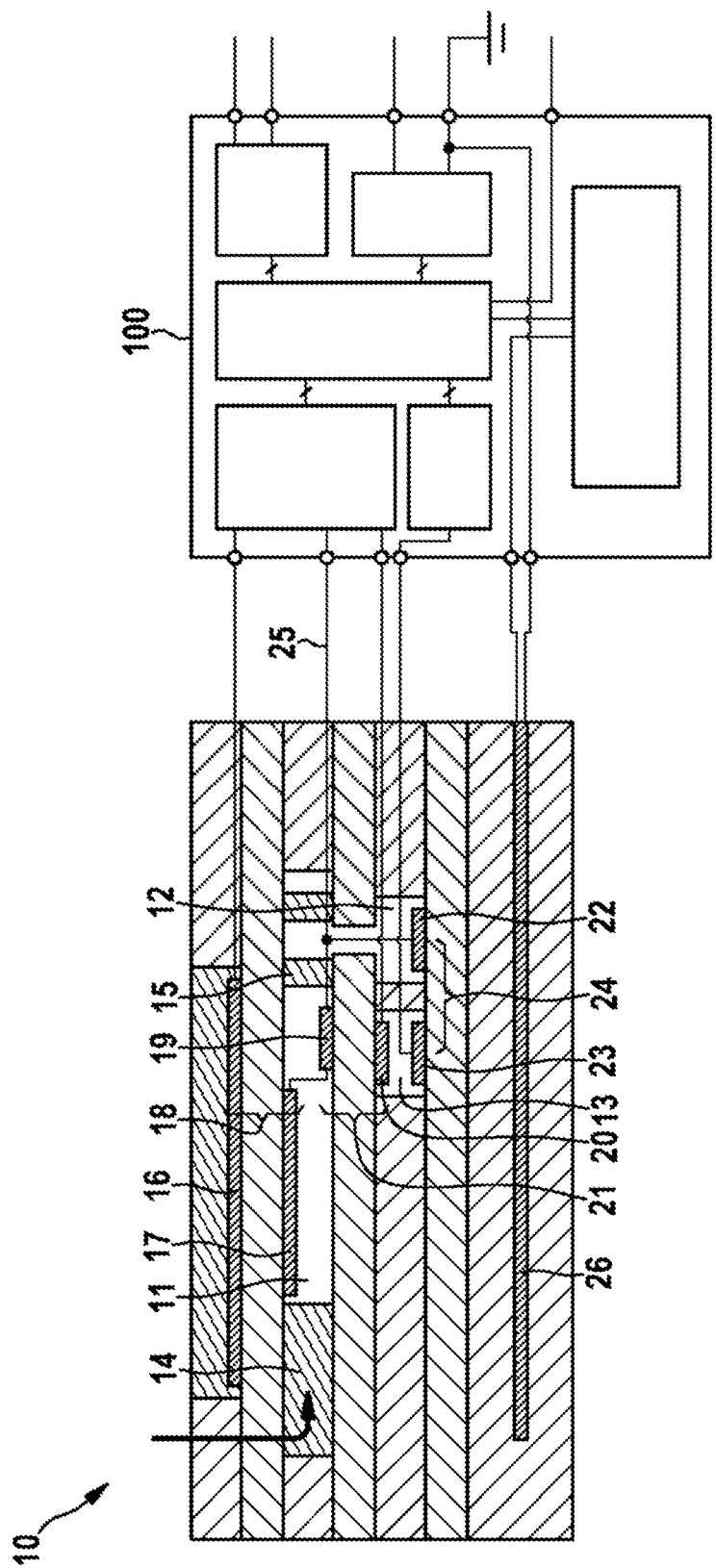
FIG. 1 shows a schematic illustration of the construction of a NOx sensor, based on the Nernst principle, from the prior art.

FIG. 1 illustrates an exemplary design of a NOx sensor 10 known per se, which is constructed according to the Nernst principle. The sensor 10 is implemented in a layered structure on the basis of an oxygen-ion-conducting solid electrolyte (zirconium dioxide) and insulating layers made of aluminum oxide, wherein a first cavity 11, a second cavity (measuring chamber) 12, and a reference gas space 13 are provided. The exhaust gas flows in the direction of the arrow via a first diffusion barrier 14 into the first cavity 11. The second cavity 12 is separated from the first cavity 11 via a second diffusion barrier 15. An outer pump electrode (APE) 16 subjected to the exhaust gas and an inner pump electrode (IPE) 17 in the first cavity 11 form the oxygen pump cell 18. Furthermore, a Nernst electrode (NE) 19 is located in the first cavity 11. The corresponding reference electrode (RE) 20 is located in the reference gas space 13. This pair forms the Nernst cell 21. A NOx pump electrode (NOE) 22 is arranged in the second cavity (measuring chamber) 12. Its counter-electrode (NOCE) 23 is located in the reference gas space 13. These two electrodes form the NOx pump cell 24. All electrodes in the first and in the second cavity 11, 12 have a common return conductor (COM) 25. Furthermore, a heater 26 for the sensor 10 is provided.

The operation of the sensor 10 is carried out in a way known per se by means of a sensor control unit (SCU) 100. The inner pump electrode 17 only has weak catalytic activity, for example, due to an alloy of platinum with gold. The pump voltage applied during the conventional measuring operation is therefore only sufficient to split (dissociate) oxygen molecules. NO is only dissociated slightly at the adjusted pump voltage and passes the first cavity 11 with only minor losses. As a strong oxidizing agent, $NO_2$ is converted directly into NO at the inner pump electrode 17. Ammonia reacts at the inner pump electrode 17 in the presence of oxygen and at temperatures of, for example, 650° C. to form NO and water. Because of the higher voltage which is applied at the NOx pump electrode 22 and due to the admixture of, for example, rhodium, by which the catalytic activity of the NOx pump electrode 22 is enhanced, NO is completely dissociated at the NOx pump electrode 22. The oxygen formed in this case is pumped out through the solid electrolyte. The resulting pump current is a measure of the nitrogen oxides in the exhaust gas.

Figure 2:
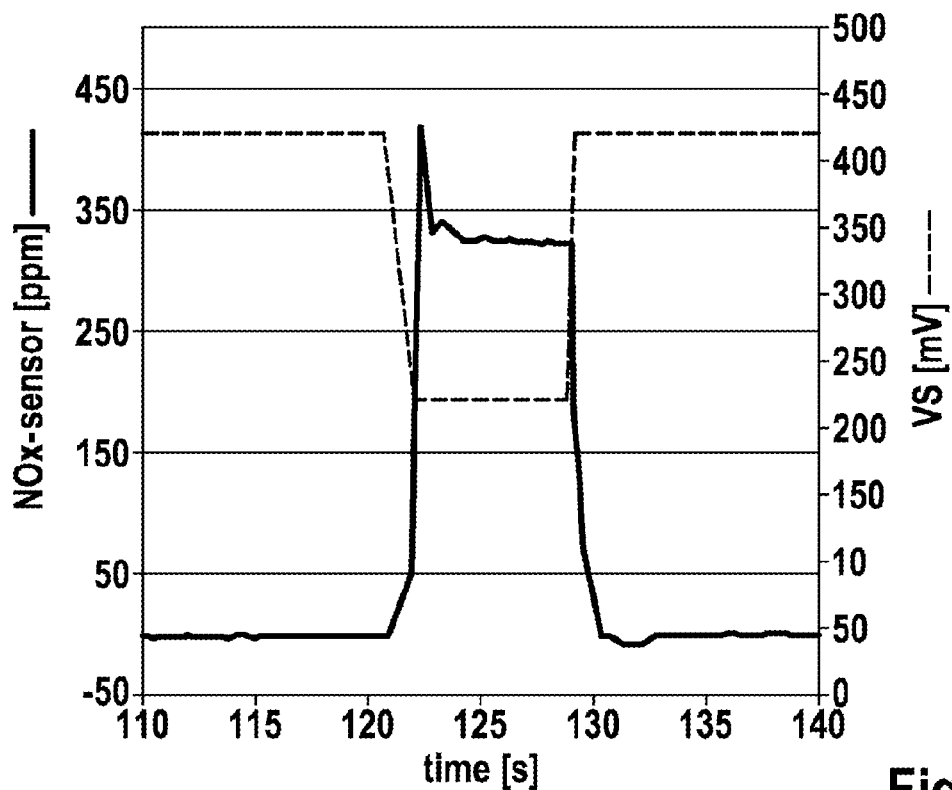
FIG. 2 shows an exemplary signal curve (NOx and Nernst voltage) in the case of the internal diagnosis of a NOx sensor according to the prior art.

In order to fulfill the OBD-II legislation in particular, a NOx sensor has to enable various diagnoses for the engine control unit. For this purpose, a differentiation is made between electrical diagnoses, which detect short-circuits between the various contacts to ground or the battery, and plausibility checks, to monitor the offset of the sensor (error at 0 ppm), and the so-called internal diagnosis (NOx cell status function), which can detect a possible sensor fault at high NOx concentrations. Carrying out the internal diagnosis known per se is illustrated on the basis of FIG. 2. To simulate a defined NOx pump current >0, the Nernst voltage (VS) is reduced, for example from 425 mV to 225 mV. A small share of the $O_2$ molecules from the exhaust gas is thus no longer pumped out at the oxygen pump cell 18, but rather passes through the second diffusion barrier 15 up to the NOx pump electrode 22. After several seconds, a stable NOx pump current has resulted, which corresponds to approximately 300 ppm in this example. The NOx signal is integrated over several seconds, so that the result is an integral value. Subsequently, the Nernst voltage is increased to 425 mV again, and the sensor returns into the normal operating mode, wherein the NOx signal is enabled again after a short waiting time. During an initial calibration of the system (new part), the measured integral value is typically stored as a reference value, so that the integral value measurable in later operation can be compared to this reference value.

Figure 3:
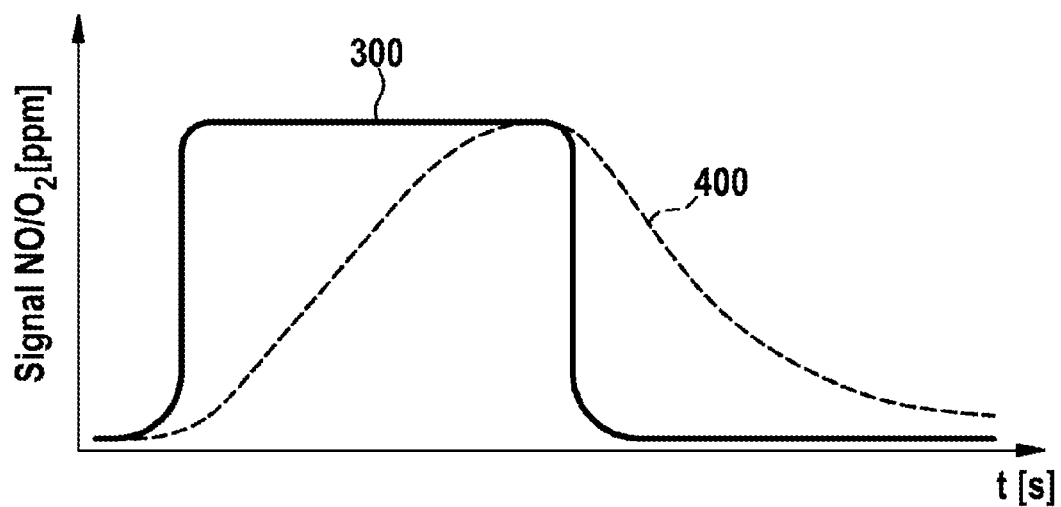
FIG. 3 shows an exemplary signal curve in the case of the dynamic response monitoring according to the invention of a NOx sensor.

FIG. 3 illustrates the signal curve during the internal diagnosis according to the method according to the invention, wherein the integral of the NOx signal after the reduction of the Nernst voltage is not observed, but rather the time curve of the resulting pump current is observed, to be able to infer a possibly impaired dynamic response of the NOx sensor. The illustrated $NO/O_2$ signal results from the internal diagnosis which is carried out, comparable to the method illustrated on the basis of FIG. 2. A signal curve 300, which is to be expected in the case of a NOx sensor which is operating correctly, is shown in FIG. 3. Furthermore, a signal curve 400 is shown, from which a sensor which is not operating correctly may be inferred. The rise and fall of the signal 300 are substantially steeper than in the case of the signal 400. According to the invention, the dynamic curve of the respective signal is analyzed, for example, on the basis of a gradient of the signal curve. For example, a value may be ascertained which represents the gradient in the case of the rising pump current or the gradient in the case of the pump current falling again after the increase of the Nernst voltage. The respective value can be compared to a suitable reference value or expected value, so that a possibly existing impaired dynamic response can be inferred, as in the signal curve 400. In this way, in particular damage at the NOx pump electrode (poisoned electrode) and/or at a diffusion barrier (clogged NOx diffusion barrier) within the NOx sensor may be established. For example, if the NOx pump electrode is greatly damaged because of poisoning during operation, the reaction is delayed at the NOx pump cell, so that this can be recognized by analyzing the gradient during the internal diagnosis. An evaluation of the signal gradient can take place in both directions in this case. Firstly, the gradient can be analyzed during a rise of the pump current, which occurs during the reduction of the Nernst voltage (at the beginning of the internal diagnosis). Secondly, the gradient can be analyzed during the fall of the pump current as a result of the increase of the Nernst voltage (end of the internal diagnosis).

The method according to the invention is not restricted to NOx sensors such as those schematically illustrated in FIG. 1. Rather, the method according to the invention can also be used in the case of other NOx sensors in which an internal diagnosis is carried out by flooding with oxygen.

The invention claimed is:

1. A method for monitoring a NOx sensor (10) having an oxygen-ion-conducting solid electrolyte, at least one cavity (12), a Nernst cell (21), and a NOx pump electrode (22) that is arranged within at least one cavity (12), the method comprising
    flooding, during an internal diagnosis of the NOx sensor, the at least one cavity (12) of the NOx sensor with a defined oxygen concentration by reducing a voltage of the Nernst cell (21);
    analyzing a time curve of a resulting NOx pump current (300, 400), wherein at least one variable representative of the time curve of the resulting NOx pump current (300, 400), is analyzed; and
    inferring an impaired dynamic response of the NOx sensor (10) in response to determining a deviation of the at least one variable in comparison to one or more reference values.

2. The method as claimed in claim 1, characterized in that the time curve is analyzed based on a variable representing a gradient in a case of a rising pump current (300, 400) during the internal diagnosis.

3. The method as claimed in claim 1, characterized in that the time curve is analyzed based on a variable representing a gradient in a case of a falling pump current (300, 400) during the internal diagnosis.

4. The method as claimed in claim 1, wherein inferring an impaired dynamic response of the NOx sensor (10) further includes inferring either or both a poisoned NOx electrode (22) in the NOx sensor and a clogged NOx diffusion barrier (15) in the NOx sensor.

5. The method as claimed in claim 1, wherein NOx sensor (10) is configured to be arranged in an exhaust system of an internal combustion engine of a motor vehicle.

6. The method of claim 5, wherein the NOx sensor is arranged downstream of a turbocharger associated with the internal combustion engine.

7. The method of claim 5, wherein the NOx sensor is arranged downstream of a nitrogen oxide storage catalytic converter.

8. The method of claim 5, wherein the NOx sensor is arranged downstream of a diesel particle filter.

9. The method of claim 5, wherein the NOx sensor is arranged upstream of an SCR catalytic converter.

10. The method of claim 5, wherein the NOx sensor is arranged downstream of the SCR catalytic converter.

11. A non-transitory computer readable medium comprising program code to perform each step of the method as claimed in claim 1.

12. An electronic control unit which is configured to carry out the steps of a method as claimed in claim 1.

* * * * *